United States Patent
Al Ghatta et al.

[11] Patent Number: 5,869,561
[45] Date of Patent: Feb. 9, 1999

[54] ARTICLES FROM A POLYESTER RESIN REINFORCED WITH GLASS FIBRE

[75] Inventors: Hussain Ali Kashif Al Ghatta, Fiuggi; Tonino Severini, Colleferro; Sandro Cobror, Naples, all of Italy

[73] Assignee: Sinco Engineering S.p.A., Italy

[21] Appl. No.: 947,236

[22] Filed: Oct. 8, 1997

Related U.S. Application Data

[63] Continuation of Ser. No. 535,034, filed as PCT/EP94/01368 Apr. 24, 1994 published as WO94/26814 Nov. 24, 1994, abandoned.

[30] Foreign Application Priority Data

May 7, 1993 [IT] Italy ........................... MI93 A 000916

[51] Int. Cl.$^6$ ................................ C08J 5/10; C08K 3/40; C08L 31/06
[52] U.S. Cl. ........................... 524/494; 524/492; 524/493
[58] Field of Search ................................. 524/492, 493, 524/494

[56] References Cited

U.S. PATENT DOCUMENTS 3,553,157   1/1971   Dijkstra ..................................... 260/40

FOREIGN PATENT DOCUMENTS 0 422 282   4/1991   European Pat. Off. .

*Primary Examiner*—James J. Seidleck
*Assistant Examiner*—U. K. Rajguru
*Attorney, Agent, or Firm*—Edward D. Manzo; Mark J. Murphy

[57] ABSTRACT

Articles from a polyester resin reinforced with glass fiber obtained by melt-shaping of the resin mixed with the glass fiber and a polyfunctional compound capable of increasing the intrinsic viscosity of the resin by addition reactions with the end groups of the rein using melt residence times during the shaping phase lower than 120 sec. and temperatures lower than 300° C.

4 Claims, No Drawings

ARTICLES FROM A POLYESTER RESIN REINFORCED WITH GLASS FIBRE

This is a continuation of application Ser. No. 08/535,034, filed as PCT/EP94/01368 Apr. 24, 1994 published as WO94/26814 Nov. 24, 1994, now abandoned.

BACKGROUND OF THE INVENTION

The present invention relates a process for the preparation of glass fibre reinforced articles from polyester resin.

It is known that the addition of glass fibre to polyester resins may improve the mechanical properties of the resins and particularly their impact strength.

U.S. Pat. No. 3,553,157 discloses the production of articles with thick walls by shaping the resin in the molten state, carried out in the presence of polyfunctional compounds capable of reacting with the resin end groups to lead to an extension of the polymer chain. The polyfunctional compound bringing about an extension of the polymer chain counterbalances the thermal degradation reactions which occur during the shaping process of the article.

It is possible to obtain shaped articles with sufficiently high values of intrinsic viscosity to ensure the necessary mechanical properties of the article.

U.S. Pat. No. 3,553,157 also describes the rein glass fibres reinforced articles.

The fibres are preferably used in a quantity comprised between about 10 and 45% by weight of the polyester resin and the glass fibres.

The polyfunctional compounds most preferred are the polyisocyanates. The use of tetracaboxyilic acid dianhydrides and particularly the use of pyromellitic dianhydride (PMDA) are also described.

As already indicated, the presence of polyfunctional compounds during the shaping phase allows shaped articles with intrinsic viscosity higher than that of the starting polymer to be obtained, and which, in the case of the polyisocyanates, can have an intrinsic viscosity of 3 dl/g or more.

Regarding the use of PMDA, the I.V. highest value is about 0.84 dl/g.

The I.V. increase depends on the PMDA concentration; it reaches a peak and then decreases.

The highest theoretical value of the increase is obtained when the PMDA concentration corresponds to that necessary to react with all the reactive groups of the resin. The viscosity decreases when PMDA is in excess of said value (the maximum of the IV increase obtained when the PMDA reacts with all the reactive end groups of the resin).

Regarding the shaping of articles reinforced with glass fibres, it has been observed that the polymer intrinsic viscosity decreases considerably with respect to the value obtainable in the shaped articles, and is not reinforced with glass fibres. The above situation practically excludes the possibility of obtaining articles reinforced with glass fibres having I.V. values sufficiently high to show the good mechanical properties obtainable with high values of I.V.

It has been unexpectedly found, and this is in contrast with the teaching derived from U.S. Pat. No. 3,553,157, that it is possible to obtain, by melt shaping of polyester resins, articles reinforced with glass fibres having sufficiently high values of I.V. to give the shaped article mechanical properties of high interest.

SUMMARY OF THE INVENTION AND DETAILED DESCRIPTION OF THE PREFERRED EMBODIMENTS

The melt-shaping process of the present invention is carried out by shaping a glass fibre article in the presence of a polyfunctional compound, capable of increasing the intrinsic viscosity of the polyester resin by addition reactions with the resin end groups, using residence times during the melt-shaping that are lower than about 120 sec. and temperatures of the molten resin lower than about 300° C. Preferably, the residence times are between 20 to 100 sec., and the temperatures are between 260° and 280° C.

The residence time generally decreases with a temperature increase.

The polymer intrinsic viscosity in the shaped article is higher than about 0.6 dl/g and is preferably between 0.7 and 1.8 dl/g.

The intrinsic viscosity is determined at 25° C. in solutions of 0.5 g resin in 100 ml of 60:40 weight ratio of phenol/tetrachloroethane. In U.S. Pat. No. 3,553,157, the viscosity is measured in o-chlorophenol at 25° C. The difference in results with respect to the measurement in phenotetrachloroethane is negligible.

In conformity with the preferred mode, the resin and the polyfunctional compound are blended in the molten state at temperatures lower than 300° C. and with residence times lower than 200 sec., preferably between 20 and 100 sec. The molten mixture of the resin and the polyfunctional compound is pelletized to obtain chips.

The obtained chips are fed to a co-rotating twin screw extruder; the glass fibres are then fed and blended into the molten polymer, and the mixture is extruded to shape the article. The residence time of the mixture blended with the glass fibres is lower than approximately 120 sec.

The shaped article can be subjected to a solid state poly-addition treatment carried out at a temperature between 180° and 200° C. to obtain an additional increase of polymer intrinsic viscosity and also a higher dimensional stability to the thermal deformation. The I.V. after the upgrading treatment can be higher than 1.0 dl/g.

The cooling of the shaped article can be carried out slowly and in a controlled way to allow polymer crystallization without using thermal treatments which are generally carried out at temperatures higher than 100°, and preferably between 140° and 170° C.

The crystallization brings about improvements in the mechanical properties, such as the flexional strength, but also tends to reduce impact strength.

The polyfunctional compound is preferably selected from the dianhydrides of the aromatic tetracarboxylic acids. The pyromellitic dianhydride is the preferred compound. Other dianhydrides usable are those of 3,3'4,4' diphenyltetracarboxylic acid, (perylene 3,4,9,10) tetracarboxylic acid, 3,3'4,4'-benzophenonetetracarboxylic acid, 2,2-bis(3,4-dicarboxyphenyl) propane, bis (3,4-dicarboxyphenyl) ether, bis (3,4 dicarboxyphenyl) sulfone; 1,2,3,4 cyclobutanetetracarboxylic acid; 2,3,4,5 tetracarboxytetrahydrofuran. The polyfunctional compounds are used in a quantity from about 0.05 to 2% by weight of the resin.

The addition of the glass fibres considerably increases the impact strength, the flexional modulus and the stress at break of the shaped articles.

Even the use of quantities of about 5% by weight of the polyester resins and the glass fibres has the effect of improving the mechanical properties; the preferred concentration of glass fibres is generally between 10 and 50% by weight.

The glass fibres have generally a length from 0.2 to 1 mm.

The finishing agents are of known type and can include compounds such as vinyltrichlorosilane, Cr-methacrylates and of other metals, titanium alcoholates.

Conventional additives can be added to the resin, such as stabilizers, antioxidants, plasticizers, nucleating compounds, pigments, flame retardant compounds, and inert reinforcing fillers such as calcium carbonate and talc.

The glass reinforced resins usable in the present process of the invention, due to their melt-rheological properties characterized by high shear sensitivity, are particularly suitable for foaming end extrusion blow-molding applications.

The polyester resins used in the process of the present invention are the product of the polycondensation reaction of an aromatic dicarboxylic acid such as terephthalic acid or its derivatives such as dimethylester or naphthalendicarboxylic acids with diols with 2–12 carbon atoms such as ethylene glycol, 1.4-cyclohexanglycol, 1.4-butandyol.

The definition also comprises copolymers in which part of the units deriving from the terephthalic acid (up to about 25%) are replaced with isophthalic acid or from while others are dicarboxylic acids.

The polyethyleneterephthalate and polynaphthalenates are the preferred resins.

The polyester resin can be mixed with other compatible polymers such as polycarbonates, polycaprolactone in amounts up to about 20% by weight.

The addition of small amounts of up to 5% by weight of polymers or compounds having properties of liquid crystals and containing reactive groups such as the OH and $NH_2$ groups improves the mechanical properties.

EXAMPLE 1

30 Kg/h of polyethylenterephthalate (PET) having a melting point at 253° C. and intrinsic viscosity of 0.66 dl/g are continuously fed from the melt-polycondensation section of PET, to a counter rotating not intermeshing twin screw extruder with 30 mm diameter and with outgassing device 590 g/h of a mixture of 20% by weight of pyromellitic dianhydride (PMDA) and crystalline PET (I.V.=0.64 dl/g) are continuously fed to the extruder by using a gravimetric dosing device.

The test conditions were as follows:

pyromellitic dianhydride in the melt=0.6% by weight screw speed=415 RPM screw ratio length (L/D)=24

Average residence time=18–25 sec barrel temperature=283° C.

melt temperature=290° C.

A die with double hole is used for the extrusion diameter=7 mm).

A strand pelletizer is used to obtain cylindrical chips with 3 mm diameter and 5 mm length. The chips intrinsic viscosity is 0.65 dl/g.

10 Kg/h of so obtained chips are fed after drying to a twin screw extruder with diameter 70 mm and ratio L/D 32.

After polymer melting (L/D=12) the given glass fibre amount is fed through a lateral port.

The remaining length (20 L/D) is used for mixing the glass fibres with the polymer. The residence time in the extruder is of 60–90 sec.

The mixture is extruded through a flat die of 750 mm length and collected on 3 cooled drums and then further cooled to stabilize the obtained foil. A part of the foil is subjected to upgrading at 190° C. for 12 hours.

The mechanical properties are shown in the table. The mechanical properties of the foil not subjected to upgrading are also reported.

The mechanical properties were determined with a Histron Series 4500 machine operating at 10 mm/min and at room temperature.

At least 5 specimens for each sample were tested.

The impact properties were determined by using a Tester Izod Ceast using a 2J hammer and notched specimens.

TABLE

| FOILS | Intrinsic Viscosity dl/g | Tensile Modulus GPa | IZOD impact strength J/m |
|---|---|---|---|
| 1) PET | | 2.5 | 30 |
| 2) PET + 0.4% PMDA | | 2.5 | 38 |
| 3) PET + 20% glass fibres + 0.4% PMDA | 0.80 | 4–7.1 (*) | |
| 4) PET + 30% glass fibres + 0.4% PMDA | 0.850 | 5.1–9.4 (*) | 118 |
| 5) PET + 40% glass fibres + 0.4% PMDA | 0.860 | 6.2–14.8 (*) | 140 |
| 1) after upgrading at 90° C. × 12 h | | 3.4 | |
| 2) after upgrading at 90° C. × 12 h | | 3.5 | |
| 3) after upgrading at 90° C. × 12 h | 0.85 | 4.9–8.7 (*) | 80 |
| 4) after upgrading at 90° C. × 12 h | 0.920 | 6–11 (*) | 90 |
| 5) after upgrading at 90° C. × 12 h | 0.950 | 6.4–13.8 (*) | 118 |

(*) The highest values were referred to the extrusion direction, the lowest ones to an orthogonal direction.

EXAMPLE 2

Results similar to those reported in example 1 were obtained using PET scraps having I.V.=0.62 dl/g and melting point of 253° C. instead of the PET of example 1.

We claim:

1. A process for the preparation of glass fibre reinforced articles from a polyester resin comprising the steps of melt-mixing the resin with a polyfunctional compound selected from the group consisting of the dianhydrides of aromatic tetracarboxylic acids, 1,2,3,4-cyclobutane tetracarboxylic acid and 2,3,4,5-tetracarboxyhydrofuran, then pelletizing the melt-mixed resin and polyfunctional compound, then melt-mixing the pelletized resin with glass fibres, and then shaping the glass reinforced resin using a residence time from 20 to 120 seconds and at a temperature from 260° C. to less than 300° C.

2. Process according to claim 1 wherein the glass fibre is used in a quantity between 10 and 50% by weight.

3. Process according to claim 1 wherein the polyfunctional compound is the pyromellitic dianhydride used in a quantity from 0.05 to 2% by weight on the resin.

4. Articles made according to the process of claim 1 from polyester resin reinforced with glass fibres wherein the resin has an intrinsic viscosity higher than 0.6 dl/g and contains pyromellitic dianhydride in an amount from 0.05% to 2% by weight based on the weight of the resin.

* * * * *